(12) United States Patent
Raghavan et al.

(10) Patent No.: US 7,571,150 B2
(45) Date of Patent: Aug. 4, 2009

(54) REQUESTING, OBTAINING, AND PROCESSING OPERATIONAL EVENT FEEDBACK FROM CUSTOMER DATA CENTERS

(75) Inventors: Arun D Raghavan, Seattle, WA (US); Ashvinkumar J. Sanghvi, Sammamish, WA (US); Vij Rajarajan, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 11/107,297

(22) Filed: Apr. 15, 2005

(65) Prior Publication Data
US 2006/0235822 A1 Oct. 19, 2006

(51) Int. Cl.
G06F 17/00 (2006.01)
(52) U.S. Cl. ............................................ 707/1; 705/59
(58) Field of Classification Search ...................... 707/2, 707/104.1, 102, 1; 705/59, 51; 717/120
See application file for complete search history.

(56) References Cited

U.S. PATENT DOCUMENTS

| 6,226,659 | B1 * | 5/2001 | Wong et al. ................. 715/526 |
| 6,360,246 | B1 * | 3/2002 | Begley et al. ............... 709/203 |
| 7,130,812 | B1 * | 10/2006 | Iyer et al. .................... 705/10 |
| 2001/0039501 | A1 * | 11/2001 | Crevel et al. .................. 705/1 |
| 2002/0019977 | A1 * | 2/2002 | Matsuzuki ................... 717/170 |
| 2004/0167859 | A1 * | 8/2004 | Mirabella .................... 705/59 |
| 2006/0224699 | A1 * | 10/2006 | Kruse et al. ................. 709/219 |
| 2006/0242288 | A1 * | 10/2006 | Masurkar .................... 709/223 |
| 2007/0286198 | A1 * | 12/2007 | Muirhead et al. ........... 370/392 |

OTHER PUBLICATIONS

Association for Library Collections & Techinical Services. Serial Section. Acquisitions Committee, Guide to performance evaluation of serials vendors, ALA Editions, 1997, 1-7.*

* cited by examiner

Primary Examiner—Wilson Lee
Assistant Examiner—Angela M Lie
(74) Attorney, Agent, or Firm—Lee & Hayes, PLLC

(57) ABSTRACT

In connection with an operations management system, a vendor feedback system reports on operational events that occur on customer data centers. The operations management system provides a standardized environment for providing feedback to a vendor of components installed at the customer data centers. Methods supported by the vendor feedback system can include directing the operations management system to report on predefined operational events involving the components installed by the vendor at the customer data centers. Event reports are then stored at the customer data centers in response to occurrences of the predefined operational events. The event reports can be generated in cooperation with the operations management system. The event reports are transmitted to the vendor as feedback relating to the components, and the vendor receives the event reports from the customer data centers. The vendor, in turn, can then analyze the event reports in detail to address any issues with the vendor's products or services, referred to collectively as components, that may be increasing the customer's TCO.

20 Claims, 6 Drawing Sheets

REQUESTING, OBTAINING, AND PROCESSING OPERATIONAL EVENT FEEDBACK FROM CUSTOMER DATA CENTERS

TECHNICAL FIELD

This invention relates to requesting, obtaining, and processing feedback on operational events from customer data centers.

BACKGROUND

Software vendors may earn the bulk of their revenue through either fees charged for the licensed use of their software, or through fees charged for professional services related to their software. Vendors who charge substantial professional services fees may charge minimal or no licensing fees, and thus the primary component of the total cost of ownership (TCO) borne by their customers is professional services fees. A portion of these professional services fees are typically necessitated to address operational events that impact customer data centers. Thus, the more frequently that operational events arise, the higher the TCO borne by customers.

For vendors who choose to collect the bulk of their revenue via licensing fees, and not rely heavily on professional services revenue, there exists a continuing need to enable the vendors to decrease the TCO borne by their customers by continually improving the vendors' software. One way to improve software and to reduce TCO is to anticipate operational events that arise on customer sites, and quickly address them. The teachings herein address this need and other shortcomings in the art.

SUMMARY

The teachings herein operate in connection with an operations management system to report on operational events that occur on customer data centers. The operations management system provides a standardized environment for providing feedback to a vendor of components that are installed at the customer data centers. The teachings herein include directing the operations management system to report on predefined operational events involving these components. Event reports are generated in cooperation with the operations management system in response to occurrences of the predefined operational events, and then stored at the customer data centers. Afterwards, the event reports are transmitted to the vendor as feedback relating to the components, and the vendor receives event reports from various customer data centers. The vendor, in turn, can then analyze the event reports in detail to address any issues with the vendor's products or services, referred to collectively as components, that may be increasing the customer's TCO.

BRIEF DESCRIPTIONS OF THE DRAWINGS

The teachings herein are described with reference to the accompanying figures. In the figures, the left-most digit(s) of a reference number identifies the figure in which the reference number first appears. The use of the same reference numbers in different figures indicates similar or identical items.

DETAILED DESCRIPTION OF ILLUSTRATIVE EMBODIMENTS

1. Overview of the Disclosure

Figure 1:
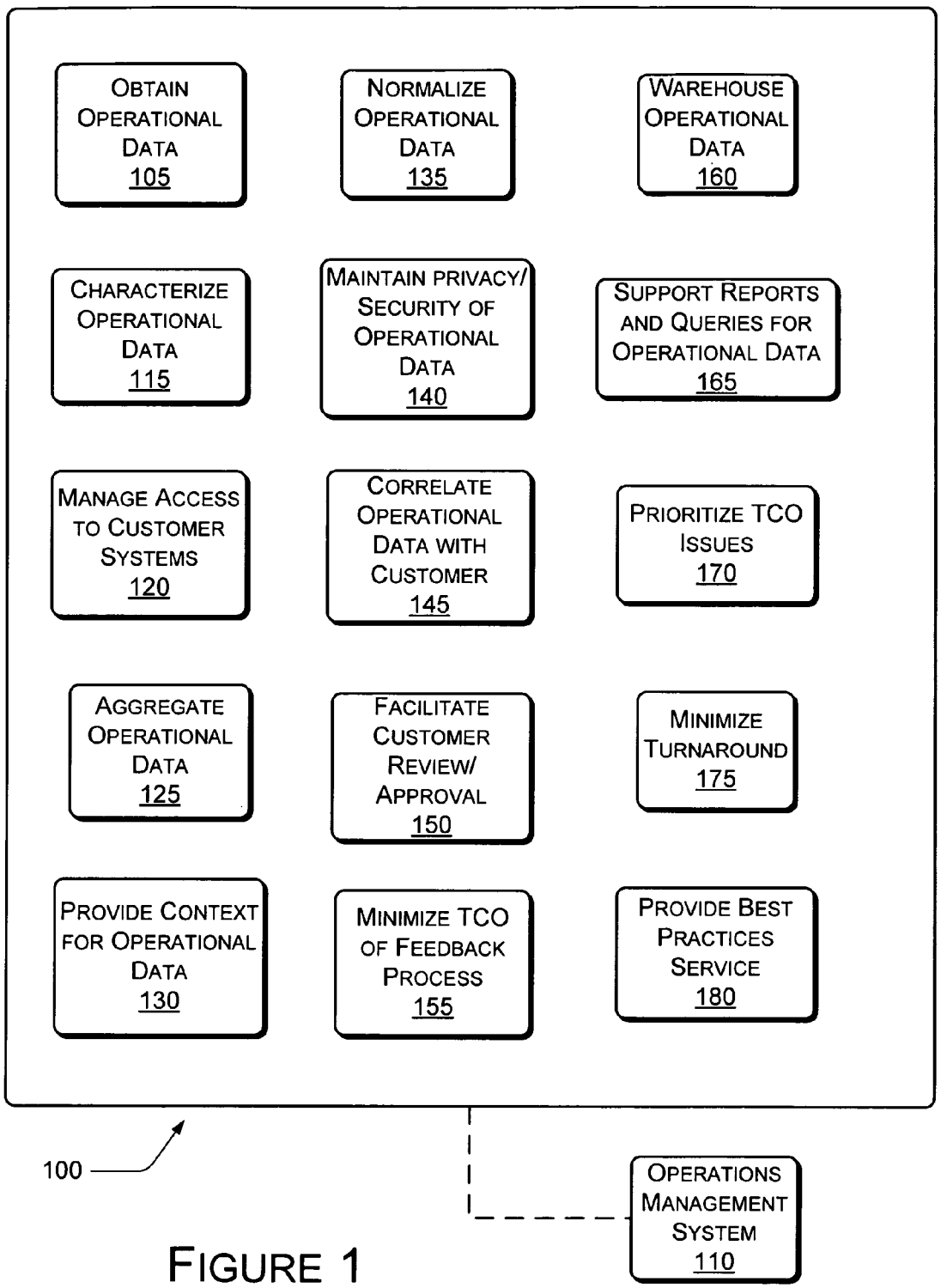
FIG. 1 is a block diagram illustrating several functional aspects of a feedback system.

Traditionally, software vendors earned the bulk of their revenue by collecting licensing fees for the use of the vendor's software. Under the traditional model, the majority of a software purchaser's total cost of ownership (TCO) typically consisted of the licensing fees paid to vendors. However, in recent years, more software vendors are operating under a revenue model in which they collect minimal (or no) licensing fees, and instead collect the bulk of their revenue through professional services related to the software. Typical examples of professional services include maintaining and supporting the software, providing consulting services relating to use or integration of the software with other systems, managing hardware and software infrastructure, providing human resources to do any of the foregoing, or the like.

Under this emerging model, the customer's TCO for the software now typically include minimal or no licensing fees, but also includes more significant fees for professional services. Industry wide, the fees charged for professional services generally exceed all the money spent on software and hardware. For example, in the operations management space, service providers and outsourcers manage the day to day operations of information technology (IT) infrastructure for their customers. This particular industry amounts to $120 billion (USD) annually.

For convenience but not limitation, this discussion refers to the traditional model as the "license fee" model, and to the emerging model as the "services fee" model. Some software vendors have chosen to maintain the license fee model, and to earn their revenue primarily through licensing fees. For these vendors to compete favorably with vendors who are operating under the services fee model, these vendors hope to minimize the TCO associated with owning and operating their software, and thereby reduce costs borne by their customers. One way for the vendor to reduce their customers' TCO is to minimize the amount, and therefore cost, of professional services associated with using the vendor's software. If vendors operating under the license fee model can achieve this objective, then they can position themselves in the marketplace as a lower-cost alternative to any competitor whose software requires extensive, expensive professional services. The cost of these professional services may well exceed the licensing fees charged by a "license fee" model vendor, resulting in overall cost savings to the customer as compared to a "services fee" model vendor.

Proceeding in more detail, the largest component of the TCO for an IT infrastructure is typically the cost of the people running the day to day operations, including responding to failures, defending against or addressing security attacks, and reconfiguring systems to meet business needs. Known methods for understanding and analyzing TCO cost typically include hiring consultants to survey a few real deployments and write case studies based on these deployments. However, these case studies generally serve nothing more than marketing needs. Typically, the sample deployments that are studied are not statistically significant, the process and the consultants are expensive, and the studies are commissioned only at certain points in the product cycle and are thus not comprehensive. Most other data gathered using known techniques is anecdotal at best.

For a vendor operating under the license fee model, one way to reduce TCO is to understand operational issues affecting customers on a daily basis, analyze these issues, and take both short and long term steps to address the issues as much as possible in the software. If these issues no longer arise, or arise less frequently, then the vendor has most likely decreased their customers' TCO. In this manner, the "license fee" model vendor can produce software that continually decreases the customer's TCO, and can thereby compete favorably with "services fee" vendors.

The vendor feedback system taught herein automates the process of obtaining real quantitative data on events that impact TCO as continuous feedback from customers, and ensures that both short and long term steps are taken to address those events and to thereby reduce the customer's TCO.

FIG. 1 illustrates several functional aspects of a vendor feedback system 100, and how it interacts with an operations management system 105. With reference to FIG. 1, the applicants now discuss these aspects of the feedback system as involved in collecting and analyzing TCO data.

Availability of Raw Data Relating to TCO

Systems, such as the "Watson" service provided by Microsoft Corporation of Redmond, Wash., collect data that might be characterized as "crash and hang" data. Such data represents events that indicate some deficiency, bug, or problem affecting hardware or software. As such, these events are unexpected and/or unpredictable.

Referring to block 105, the vendor feedback system 100 focuses on obtaining data representing operational events that are, in some sense, expected and/or predictable, and that affect the customer's TCO. However, the data on operational events that affect TCO are typically not readily available from instrumentation, because these operational events may involve human factors. Illustrative examples of parameters surround operational events might include how often a given problem was detected, how many people (and at what level of expertise) were involved in solving the resolve the problem, and how long did it took to resolve the problem. Such parameters are not typically captured using "hard" instrumentation.

However, operations management systems 110, such as the Microsoft Operations Manager service (referred to herein at the "MOM system") collect operational event data and related parameters, such as the data discussed above. For further information on operations management systems 110, the reader is directed to the website for Microsoft Corporation, more particularly, that portion of the website devoted to the MOM system.

The vendor feedback system 100 can address the issue of collecting or mining this operational event data by cooperating with or piggybacking on an operations management system 110 that tracks operational issues from detection to resolution. Such operations management systems 110 are installed and maintained on customer sites, and provide value to customers even apart from providing feedback to the vendor as described herein. These operations management systems 110 provide the feedback systems and methods taught herein with an elegant approach to accessing, managing, and maintaining systems and services deployed on customer sites. In a sense, the vendor feedback system 100 and related methods as taught herein augment or enhance the capabilities of the operations management systems 110 by providing a mechanism by which a vendor can obtain feedback from customer data centers.

Identification of an Operational Problem

Unlike a "crash" or "hang" event, either of which could be identified by a "bucket id" that points to a software component, version, and offset where the problem was detected, operational events or problems are generally described in words. For example, one could describe an issue with data lost because of a disk failure as a "File Not Found" problem" or a "File Corruption Problem" or a "Bad Block Problem". Such operational events are categorized so that analysis and resolution of the issue can proceed as efficiently as possible.

Referring to block 115, operations management systems 110, such as the MOM system, can offer a broad array of respective alert/problem IDs, which define and characterize a variety of operational events that may impact TCO. Thus, the vendor feedback system 100 can address the issue of organizing discrete operational events into broad categories by using the capabilities of the operations management systems 110 to report alerts and/or problems by unique, specific identifiers.

Access and Reach

For security, the operations management systems 110 restrict access to respective managed computer systems. Even internal administrators of the various systems have access only to the particular system for which they are responsible, and typically, access permissions are granted only on a "need to know" basis. In such environments, obtaining operational event data from all of the various systems can present a challenge for the vendor feedback system 100. However, referring to block 120, the vendor feedback system 100 can address this issue by using the existing access rights that the operations management systems 110 have across these various managed systems, including mechanisms for accessing remote systems across LANs, WANs, and firewalls.

Data Volumes

Corporations and other large enterprises who are most interested in reducing TCO may manage server farms consisting of hundreds or thousands of servers. The total volume of operational event and alert data generated by these servers can be overwhelming for a vendor to collect and process. However, turning to block 125, the vendor feedback system 100 can address this issue by using reporting services provided by the operations management systems to collect, aggregate, and summarize operational event information. The compression rate between the data entering the operations management systems 110 and the summary data produced by the operations management systems 110 can be more than a million fold. In contrast to a service such as "Watson", which reports each and every discrete "crash" or "hang" event, the vendor feedback system 100 focuses more on mining data summarizing a plurality of individual operational events.

Configuration

To provide context for a given operational event that has occurred, these operational events are tied or otherwise related to the environments in which they occurred. For example, assume that a vendor addresses a software issue by releasing a patch for the software. If only some customers apply the patch, the vendor would want to know whether the patched systems still see the issue, without being confused by irrelevant event data reported by un-patched systems. Turning to block 130, the vendor feedback system 100 address the issue by relying on the service discovery and reporting features provided by the operations management systems 110 to categorize an environment. Using these features, the vendor feedback system 100 obtains not only operational event data, but also further data describing the environment or context in which the operational event occurred.

Normalization

To provide further context for reporting operational events, it can be helpful to normalize such operational events when possible. For example, a vendor may be notified that a given customer has had 25 "Disk out of Space" events when re-indexing databases. However, this information alone may not be sufficient to enable the vendor to determine whether this number of events is excessive. However, turning to block 135, if this number of events is normalized by, for example, the volume of successful re-indexing jobs or the number of SQL servers running in that environment, then this event report becomes much more useful. Using parameters reported by the operations management systems 110, the vendor feedback system 100 normalizes these event reports to provide more meaningful context.

Privacy and Security

Most customers are very concerned with the privacy of both their own data and any data belonging to their clients. To many customers, sending private information even to a trusted vendor is not acceptable. Stack dumps or system dumps may result from a "crash" or "hang" event that occurs at a customer site, and may be reported using, for example, the "Watson" service. However, these stack/system dumps may contain data that is private, confidential, or otherwise sensitive to the customer or to the customer's clients, and thus raise privacy issues if transmitted directly to the vendor.

Turning to block 140, in contrast to these system or stack dumps, the data received and analyzed by the vendor feedback system 100 is processed by, for example, the operations management systems 110 to strip off any private information and otherwise "sanitize" the operational event data sent to the vendor. Also, as discussed above, the vendor feedback system 100 is more concerned with operational event data in aggregate or summary form, as distinguished from data pertaining to individual discrete events. In the process of summarizing operational event data, the operations management systems 110 may remove any private data that was in the raw event data.

Turning now to the issue of transmitting the operational event data from the customer to the vendor, there is a risk of third parties intercepting these transmissions, reviewing the data sent to the vendor, and thereby locating vulnerabilities in a customer's installation. In some instances, vulnerability statistics may even be part of the data sent to the vendor. However, the vendor feedback system 100 addresses these issues by encrypting the operational event data that is transmitted to the vendor. Numerous encryption packages are commercially available, offering varying levels of protection and privacy appropriate for various situations.

Tracking TCO over Time

As a precaution against violating the customer's privacy, the data sent back to the vendor from the customer is anonymous. However, this can make it difficult for the vendor to see if the customer is adopting the vendor's recommendations, such as adopting "best practice" advice or installing released software patches. Also, it may be difficult for the vendor to determine if the recommendations are having the desired effect over time for that customer. However, turning to block 145, the vendor feedback system 100 can address this issue by defining a unique, but anonymous, respective identifier for each customer. Thus, first unique identifier "A" may designate a first customer, second unique identifier "B" can designate a second customer, and so on. However, these identifiers do not actually identify the customer, but simply provide a unique designator that can be used to track data relating to the customer installation over time.

Transparency and Control

Before a typical customer agrees to send operational event data to the vendor, the customer may have a human representative of the customer review, understand, and approve the data sent to the vendor. Also, corporations and other large enterprises typically restrict how and what information may leave their premises. Generally, these entities authorize only a few people to transmit data from the corporate premises, and enable or commit only a few communications ports to do so.

Turning to block 150, in this environment, the vendor feedback system 100 produces reports at the customer site in a human-readable format (as distinguished from a binary format) so the human representative of the customer can preview, understand, and authorize the transmission of the report to the vendor. Further, the vendor feedback system 100 exports the event reports in, e.g., the XML format, which is well recognized for its capabilities in supporting the transport of documents containing structured information, and is human-readable. This illustrative XML format is not limiting, however, and other formats may be suitable in other applications. Also, the vendor feedback system 100 can authorize only an administrator of the management server, who usually has the requisite privileges or rights, to send the data to the vendor. The data can be transmitted over a generic pipe, such as that used by the "Watson" service, so no additional channels need to be opened.

TCO of the Management Solution

Turning to block 155, the vendor feedback system 100 can track operational events that impact TCO, and subsequently take actions to reduce TCO. Ironically, a feedback system designed to facilitate understanding and minimizing TCO can, itself, require hardware, software, and maintenance, all of which may actually increase TCO. If this increase in TCO is at all significant, the customer may opt-out of the feedback system, particularly if there is no immediate advantage to opting-in.

The vendor feedback system 100 can address this issue by bundling the feedback system as part of the operations management system 110, and by enabling customers to opt-in or opt-out of the vendor feedback system 100 as they choose. When the operations management system 110 is first being deployed, the vendor feedback system 100 is unpackaged and deployed with the rest of the operations management system 110. During initial deployment, the installation script may enable the customer to opt-in or opt-out of the vendor feedback system 100, but the vendor feedback system 100 is installed nonetheless. If the customer wishes to opt-in or opt-out, either during installation or afterwards, a flag included as part of a configuration settings menu can be set or cleared accordingly. Once the customer opts-in to activate the vendor feedback system 100, whether during setup of the operations management system 110 or afterwards, the customer need not do anything else. As such, the vendor feedback system 100 demands substantially no additional hardware or software than would otherwise be installed as part of the operations management system 110.

Backend Warehousing

Turning to block 160, once the operational event data arrives at the vendor's site, it is efficiently imported into a data warehouse for subsequent automated analysis and retrieval by authorized representatives of the vendor. Human-readable reports, as shown to the customers, are not necessarily conducive to this automation. However, the vendor feedback system 100 exports the event reports in, e.g., the XML format, which is well recognized for its capabilities in supporting the transport of documents containing structured information. This illustrative XML format is not limiting, however, and other formats may be suitable in other applications.

Backend Processing

Turning to block 165, once the operational event data is sent from a customer site to the vendor, the vendor feedback system 100 automatically populates a database with this operational event data. In this manner, the operational event data is made available to developers within various organizations of the vendor, particularly those developers who have products or services deployed at customer sites. These developers might wish to generate and view both standard and ad hoc reports and analytics relating to their products as deployed at the customer sites, as well as running queries against the database populated with the operational event data. To enable the above functions, the vendor feedback system 100 provides a secure reporting server and an on-line analytical processing (OLAP) server on the vendor site, both of which are accessible across the web by authorized developers and service personnel.

Watson Curve—Prioritization

Turning to block 170, if the vendor feedback system 100 is deployed across a wide customer base, these customer installations may generate millions of operational event reports over time. Across such a wide base, almost every unique problem identifier supported by the operations management system 110 can be expected to arise somewhere. In such circumstances, it may be difficult for the vendor to decide how to commit its resources most appropriately to address problems most efficiently.

Fortunately, operational problems appear to follow the "80-20" rule. More particularly, it appears that approximately 1% of operational issues are responsible for 99% of all TCO dollars spent across the installed base. In light of these circumstances, the vendor feedback system 100 enables the vendor to identify this critical 1% of the operational issues that have the most impact to their customers. By identifying and addressing this critical 1% of the operational issues using the vendor feedback system 100, the vendor can substantially decrease TOC for their customers.

Short Term Correction of Problems

Software products can typically take 3-5 years to progress through the entire development cycle and ultimately ship to customers. The vendor feedback system 100 can enable the vendor to collect and analyze data representing operational issues occurring on customer data centers, and to resolve these operational issues quickly enough to decrease TCO in the short term, and, in any event, much more quickly than the typical 3-5 year cycle Turning to block 175, the vendor feedback system 100 address this issue by using management packs (MPs) provided in connection with the operations management systems 110. MPs encapsulate knowledge, advice, and automation relevant to operating and managing a given application or service provided by the vendor. MPs can be delivered in as short a period as 3 months, and corrective rules can be delivered in a couple of days. Also, the operations management systems 110 can enable refreshed MPs to be released on the web, and can provide a mechanism in the management server's MP to detect the refresh MPs and to alert administrators of systems affected by the refreshed MP accordingly.

Further, the vendor feedback system 100 can enable vendor personnel to request that particular operational data be gathered on the various customer sites and compiled into reports transmitted to the vendor site. Rules suitable for gathering the requested data are incorporated into MPs and deployed onto the customer sites, as discussed in further detail below.

Premium Service and Best Practice Advisers

The vendor feedback system 100 provides backend processing of operational event reports, summary data, or the like, and can perform sophisticated analysis on the collected operational data to provide appropriate advice tailored for specific customers. Turning to block 180, the vendor feedback system 100 can support a premium service offered to customers. Since each customer has been assigned a unique but anonymous identifier, as discussed above, the customer can use this identifier to access a website or other similar mechanism associated with the premium service. Through the premium service, the customer can view a report that is customized to their profile and that advises best practices appropriate for the customer's profile and their current TCO issues.

2. Detailed Description

Figure 2:
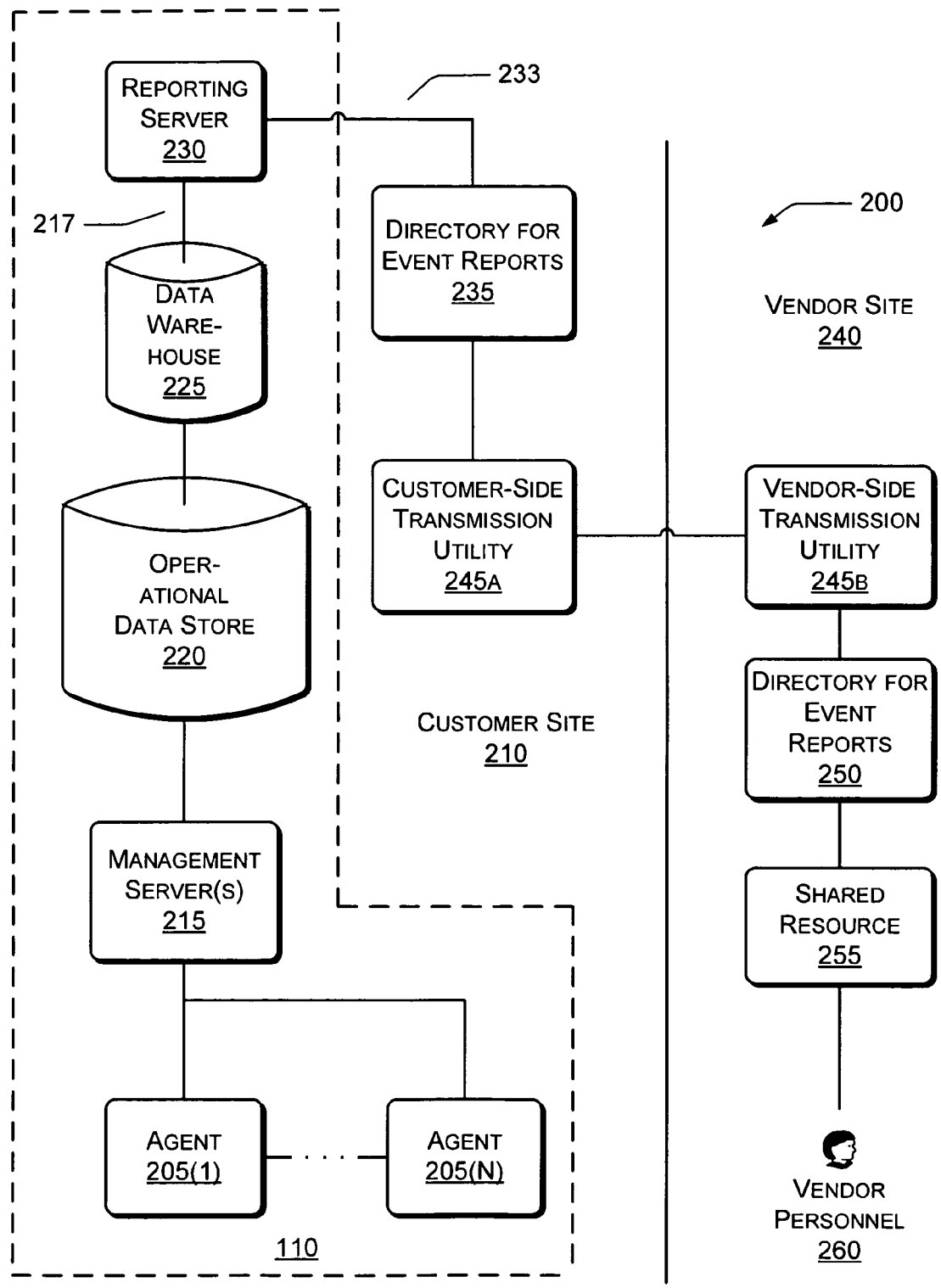
FIG. 2 is a block diagram illustrating several components of a feedback system for requesting, obtaining, and analyzing operational event data from customer data centers.

FIG. 2 illustrates an architecture 200 within which the vendor feedback system 100 operates. Infrastructure associated with the operations management system 110 is shown in dashed outline.

Agents 205 are deployed to monitor various managed components or nodes (not shown) on the customer site 210. The agents 205 act on behalf of the operations management system 110 to gather data, provide instructions, or the like. Two agents 205(1) and 205(N) are shown in FIG. 2, but any number of agents 205 can be deployed. The agents 205 communicate with one or more central servers or management servers 215, for example, to report raw operational event data 217. This raw operational event data 217 is captured in a data store 220, eventually forwarded to a data warehouse 225, and ultimately sent to a reporting server 230. The reporting server 230 stores the raw operational event data 217 in a directory structure 235 on the customer site 210.

The raw operational event data 217 is aggregated, normalized, and stripped of any private information, for example, as described in connection with blocks 125, 130, 135, and 140 as shown in FIG. 1. The raw operational event data 217 is compiled into the form of operational data reports (ODRs) 233 for transmission to the vendor site 240 (also referred to as vendor 240) using a transmission utility 245. The transmission utility 245 comprises corresponding components 245A and 245B that are deployed respectively on the customer site 210 and the vendor site 240 to facilitate communication therebetween. A suitable example of the transmission utility 245 is the Watson™ service provided by Microsoft, although other utilities 245 might be recognized as suitable by those skilled in the art. As discussed above in connection with block 150 shown in FIG. 1, the ODRs 233 can be reviewed and approved by customer personnel at the customer site 210 before transmission to the vendor 240.

On the vendor site 240, a directory 250 is reserved to receive the ODRs 233 transmitted from the customer site 210. After receipt, these ODRs 233 are organized for presentation to various development groups or other personnel 255 associated with the vendor 240. The ODRs 233 are received into a directory 250 or other similar structure, and are then loaded onto a shared resource 255 for distribution to the various vendor personnel 260, also referred to as development groups 260. The shared resource 255 can take the form of a database that is automatically populated by the vendor feedback system 100 with ODRs 233 as they arrive from the customer site 210. Thus, the shared resource 255 can support the report and query processing discussed above in connection with block 165 shown in FIG. 1.

The vendor personnel 260 may be responsible for respective products or services that are offered by the vendor 240 and deployed on the various customer sites 210. These products could include software such as operating systems, middleware and utilities, or applications such as word processing, databases, spreadsheet, e-mail servers, and the like.

Figure 3:
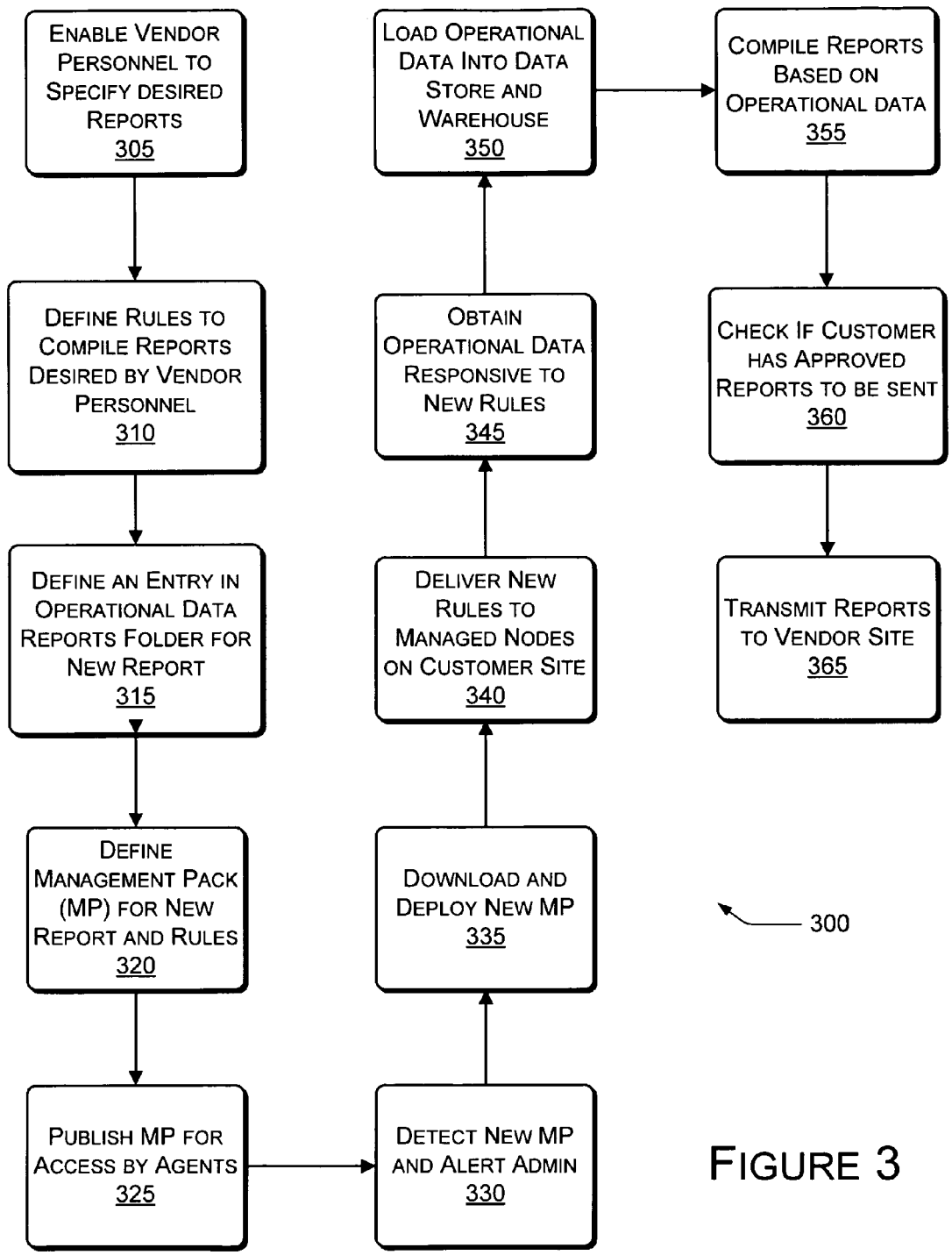
FIG. 3 is a flowchart illustrating a process by which the vendor feedback system can enable vendor personnel to specify that particular operational event data be captured on various customer sites and reported back to the vendor.

FIG. 3 illustrates a process 300 by which personnel 255 associated with the vendor 240 can request that particular ODRs 233 be captured on various customer sites 210 and reported to the vendor 240. More particularly, different vendor personnel 260 or development groups may be interested in different types of ODRs 233 obtained from the customer sites 210.

In block 305, the vendor feedback system 100 enables these different vendor personnel 260 or development groups to specify what ODRs 233 they would like to obtain from customer sites 210 where their particular products or services are deployed. These vendor personnel 260 can specify parameters related to their requests, such as: what types of ODRs 233 are sought; how often the raw operational event data 217 upon which the ODRs 233 is to be sampled (e.g., each event, or just how many events occur per unit time, etc.); how often the ODRs 233 are to be reported to the vendor 118 (e.g., weekly); how the ODRs 233 are to be formatted and reported; or the like.

In block 310, the vendor feedback system 100 defines rules designed to capture the raw operational event data 217 as appropriate to compile the ODRs 233 desired by the vendor personnel 260. This rule definition can be either an entirely automated process that operates on input obtained from the vendor personnel 260, or the vendor feedback system 100 can enable the vendor personnel 260 to define these rules manually. For example, vendor personnel 260 may specify an ODR 233 indicating how many times per week a component deployed on customer sites 210 runs out of disk space. An example rule corresponding to this ODR 233 might trap for a unique code generated by the operations management system 110 when a component runs out of disk space.

In block 315, the vendor feedback system 100 associates a folder with the new ODR 233 specified by the vendor personnel 260 in block 305. This folder can be located in the directory 235 to store the ODRs 233 at the customer site 210 pending transmission to the vendor 240, and/or can be located in the directory 250 at the vendor site 240 for storage after transmission from the customer sites 210. On the customer sites 210, the MPs direct the operations management systems 110 to allocate resources in the directories 235 and/or 250 to store the raw operational event data 217 of interest, and/or the ODRs 233 based thereon, as requested by the vendor personnel 260. This can include allocating folders, sub-directories, or other storage structures. Further, given products or services offered by the vendor 240 can be allocated to given storage structures in the directories 235 and/or 250. However, still other arrangements may be recognized as suitable by those skilled in the art.

In block 320, the vendor feedback system 100 defines one or more management packs (MPs) incorporating the requests for ODRs 233 from the various vendor personnel 260 or development groups, and the rules defined to capture the data appropriate for compiling these ODRs 233. These rules can specify directives for capturing and processing the raw operational event data 217 to populate the ODRs 233 requested by the vendor personnel 260 or development groups.

In block 325, the new MPs are published so they are accessible to the operations management systems 110 deployed at various customer sites 104. In one embodiment of the vendor feedback system 100, the MPs are posted on a website accessible to the operations management systems 110.

In block 330, the operations management systems 110 as deployed on the customer sites 210 detect the new MP as being available, and alter a systems administrator as appropriate. In block 335, the vendor feedback system 100 downloads and deploys the new MP on the customer sites 210, and delivers the new rules to the various managed nodes on the customer sites 210 (block 340).

In block 345, once the new rules are deployed on the customer sites 210, the agents 205 capture raw operational event data 217 responsive to these new rules. When operational events occur on the customer sites 210 that match a request submitted by the vendor personnel 260 or development groups, an entry is made in the directory 235 on the customer sites 210. Raw operational event data 217 representing these operational events then flows upward from the agents 205 as discussed above in connection with FIG. 2.

In block 350, the raw operational event data 217 is loaded into the data store 220 and the data warehouse 230 (see FIG. 2). In block 355, ODRs 233 are compiled based on the raw operational event data 217 stored over time in the directory 235 or in folders or sub-folders thereof.

In block 360, the vendor feedback system 100 enables the customer 210 to approve the ODRs 233 for transmission to the vendor 240. Different embodiments of the vendor feedback system 100 may enable the customer 210 to approve the ODRs 233 at the time that the vendor personnel 260 request that they be created, or may enable the customer 210 to approve the ODRs 233 when they are ready for transmission to the vendor 240.

In block 365, the ODRs 233 are transmitted to the vendor 240 for access by the vendor personnel 260 who requested the ODRs 233. When specified by the rules defied in the MPs, the ODRs 233 are sent from the customer sites 210 to the vendor 240 for review and analysis.

The ODRs 233 as sent to the vendor 240 can include at least the following information and characteristics. As discussed elsewhere herein, the ODRs 233 can be exported as XML files. Also, the ODRs 233 can have at least the following header information easily available and accessible (i.e. as properties, attributes, etc.) to be used for efficient classification and/or sorting on the vendor site 240. A script can store this information into the XML headers of the ODRs 233 that are transmitted to the vendor. These headers can include information such as the following:

An identifier to uniquely designate the customer site 210 or configuration group from which the ODR 233 was generated. As noted elsewhere herein, this identifier does not reveal any Personal Identifiable Information (PII) tending to compromise or breach the privacy of either the customer 210 or the clients of the customer 210. Instead, this identifier provides an anonymous but unique means for identifying the customer 210.

The date that the ODR 233 was created.

The name of the ODR 233 (e.g., Alert latency).

The group, product, service, or application with which the vendor personnel 260 who requested the ODR 233 is affiliated (e.g., MOM, SQL, Exchange, etc.).

The language in which the ODR 233 is transmitted (e.g., English, French, Japanese, German, etc.).

Figure 4:
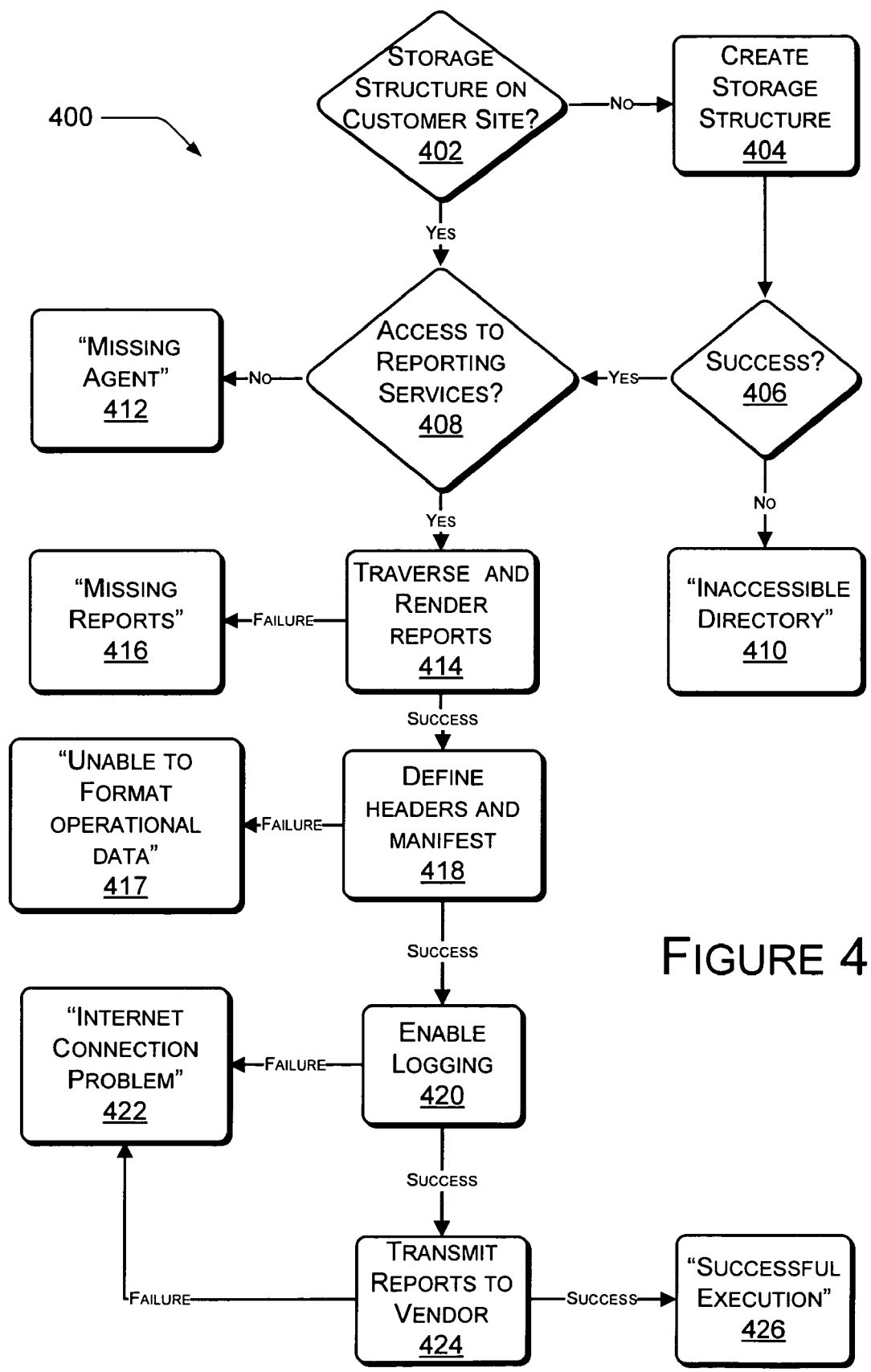
FIG. 4 is a flowchart of a process performed to send reports on operational data to the vendor.

FIG. 4 illustrates a process 400 performed by the vendor feedback system 100 to send ODRs 233 to the vendor 240. The process 400 can execute on a periodic interval as specified by the vendor 240, e.g., weekly. When so directed, the process 400 performs at least the following to transmit the ODRs 233 to the vendor 240. At block 402, the process 400 ensures that a directory 235 or other storage structure exists on the customer site 210 for storing the ODRs 233. If this directory 235 does not exist, then the process 400 attempts to create it with permissions sufficient to enable a local administrator to read from and write to the directory 235 (block 404). If the directory 235 is successfully created (block 406), the process 400 proceeds to block 408. If the directory 235 is not successfully created, the process 400 drops an appropriate failure event (block 410).

From block 402, if the directory 235 does exist, the process 400 determines whether it has access to reporting services. If so, the process 400 proceeds to block 414, where it traverses the ODRs 233 in the directory 235 (or in folders thereof) using a reporting service (not shown) such as, e.g., the Microsoft SQL Server reporting services, code-named "Rosetta". More particularly, the Simple Object Access Protocol (SOAP) API associated with Rosetta may be appropriate. However, those skilled in the art may recognize other similar services or protocols as appropriate, and these can be deployed without departing from the scope of the teachings herein.

In any event, the reporting service can be granted at least task permissions for the directory 235 sufficient to view the folders therein. For all ODRs 233 in the directory 235 (or folders thereof), the process 400 uses, for example, the Rosetta Reporting Web Services' SOAP API to render the ODRs 233 in XML format into the assigned directory 235 on the customer site 210. Once again, the reporting service can have at least "View reports" task permissions for the directory 235. Old ODRs 233 may be deleted or overwritten. If block 414 completes successfully, the process 400 proceeds to block 418. If block 414 fails, the process 400 drops an appropriate failure event (block 416).

In block 418, the process 400 loads header information into the XML headers of the ODR 233 for transmission to the vendor 118. Suitable examples of this header information are discussed above in connection with FIG. 3, and can include, for example, the information discussed above that can be used to classify the ODR 233 on the vendor site 240. The process 400 also creates a reporting manifest file that directs the process 400 to copy all the new (i.e., just rendered) reports in the directory 235 for transmission to the vendor 240. The manifest file can be compliant with a character encoding standard such as the Unicode Standard. If block 418 completes successfully, the process 400 proceeds to block 420. If block 418 fails, the process 400 drops an appropriate failure event (block 417).

In block 420, if the transmission utility 245 (e.g. the "Watson" service provided by Microsoft) supports logging, then the process 400 enables logging, if it is not already enabled. The "Watson" service includes an Application Error Reporting client, dw20.exe, which is a tool that collects information automatically whenever an application terminates abnormally, and allows users to send a report on the termination directly to Microsoft. If the "Watson" service is used, the process 400 locates the dw20.exe client, and switches on logging. If block 420 completes successfully, the process 400 proceeds to block 424. If block 420 fails, the process 400 drops an appropriate failure event (block 422).

In block 424, the process 400 can compress and organize the plurality of ODRs 233 into a single file, for transmission from the customer site 210 to the vendor 240. A cabinet (.cab) file, which is a library of compressed files stored as a single file, can be used to organize installation files that are copied to customer sites 210. However, .cab files and methods related thereto can be equally suitable for packaging the ODRs 233 for transmission to the vendor 240, and may facilitate this transmission.

If the "Watson" service is selected, it can be used in silent mode to archive all of the ODRs 233 into a .cab file and to send the .cab file to the vendor 240 through the Watson pipeline. Key features of the "Watson" service include using SSL (HTTPS) port 443 for all confidential data, guarding against DNS spoofing, verifying digital packet identifiers (PIDs) against lists of known troublemakers, and IP tracking for static downloads. In light of the foregoing features, the level of security already provided by the "Watson" pipeline may make it unnecessary to encrypt the transmission using independent means.

If block 424 completes successfully, the process 400 drops a success event (block 426). If block 424 fails, the process 400 drops an appropriate failure event (block 422).

FIG. 3 illustrates several non-limiting error alerts or events, including the following, or variants thereof:

"Send Operational Data Reports to Vendor—Operational Data Reports Directory Inaccessible" (block 410);

"Send Operational Data Reports to Vendor—Operational Data Reports Missing" (block 416);

"Send Operational Data Reports to Vendor—Missing Agent" (block 412);

"Send Operational Data Reports to Vendor—Unable to Format Operational Data Reports" (block 417); and "Send Operational Data Reports to Vendor—Internet Connection Problem" (block 422).

If the ODRs 233 are sent to the vendor 240 successfully, then the process 400 sends a success alert message such as "Send Operational Data Reports to Vendor—Execution success" (block 426).

Figure 5:
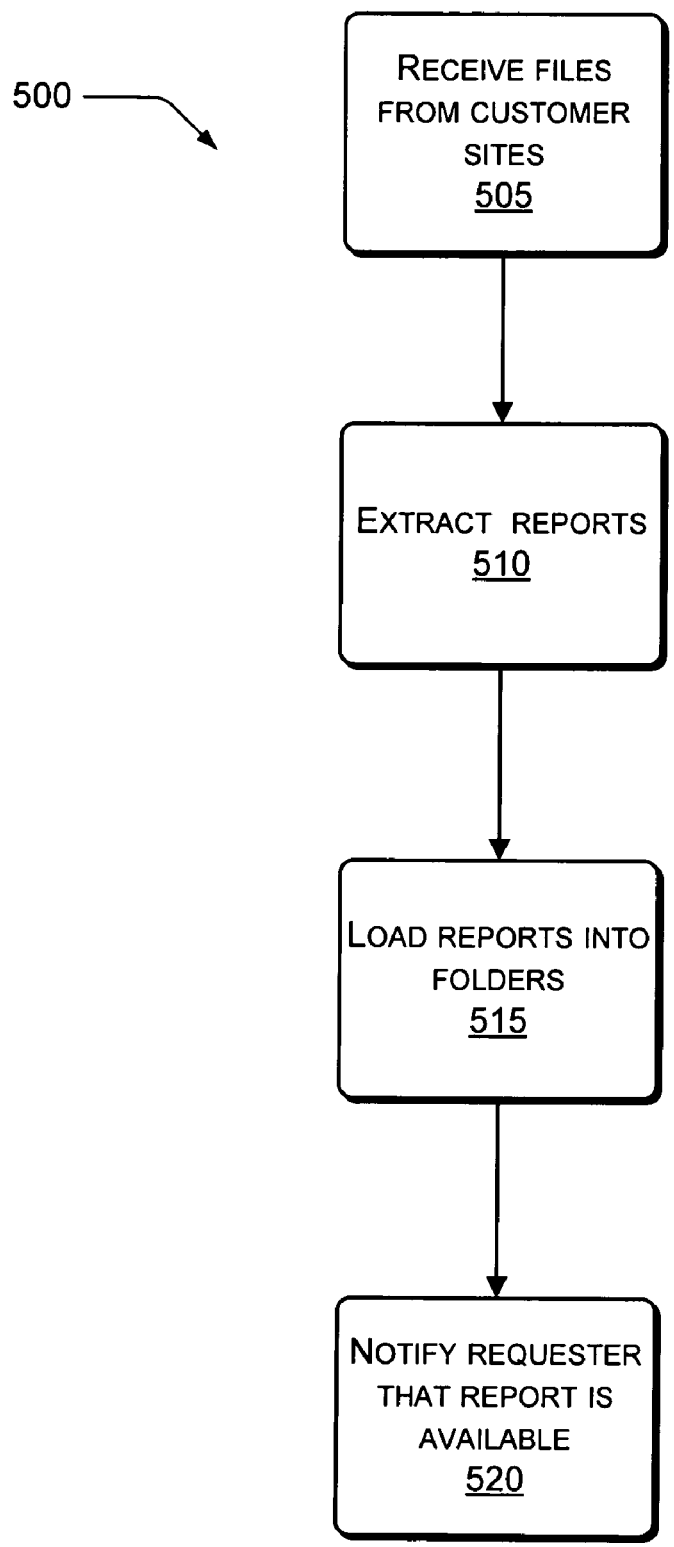
FIG. 5 is a flowchart illustrating a process for receiving operational data reports at the vendor's site.

FIG. 5 illustrates a process 500 for receiving ODRs 233 at the vendor site 240. The process 500 can execute in the back-end of the vendor 240, and can perform at least the following. At block 505, the ODRs 233 are received from the customer sites 210, using, for example, the process 400 described above in connection with FIG. 4. The process 500 can be executed from a shared resource 255, which can take the form of a secure server hosting a data base that is accessible to suitably authorized vendor personnel 260. On, for example, a daily basis, the .cab files from the customer sites 210 are copied from a directory 235 or other storage structure associated with the operations management system 110.

In block 510, the ODRs 233 are extracted from the .cab files and loaded into folders on the shared resource 255 (block 515). In some embodiments of the vendor feedback system 100, data from the ODRs 233 is automatically populated into a database hosted by the shared resource 255. Permissions for the directories or folders on the shared resource 255 can be set to allow lead persons within the vendor personnel 260 to have full access to and control of the ODRs 233 and related folders. Inside each of these folders can be "weekly" sub-folders. These weekly sub-folders can be named using the week's first and last dates. Finally, inside these sub-folders are specific ODRs 233 that were collected during that week from different configuration groups on the customer sites 210.

In some embodiments of the vendor feedback system 100, vendor personnel 260, groups, or other internal vendor groups (and their corresponding MPs) are given access only to respective folders or sub-folders that are associated with, or correspond to, their product, service, application, or group. As discussed above in connection with FIG. 3, these vendor personnel 260 can use the vendor feedback system 100 to request and receive ODRs 233 relating to any aspect of the performance of products or services that the vendor 240 deploys on customer sites 210. For example, if an aspect of an operating system is causing a disproportionate number of issues, then the vendor personnel 260 responsible for that aspect of the operating system can request reports on any ODRs 233 that may provide information helpful to resolving those issues. If the operating system is deployed across a wide variety of different customer sites 210, then collecting ODRs 233 from the different environments prevailing at these various customer sites 210 can be helpful in resolving the issues.

In any event, once the folders or other suitable data structures are populated with the ODRs 233, the vendor personnel 260 or other persons who requested the ODRs 233 are notified that the ODRs 233 are available for review and analysis. The ODRs 233 may be posted on the shared resource 255, preferably a secure server hosting a database, for access and review, or they may be transmitted to the vendor personnel 260, assuming appropriate security safeguards and precautions are followed.

Once received, the vendor personnel 260 can analyze the ODRs 233 in detail to, for example, isolate trends in the operational events represented in the ODRs 233, and possibly associate these trends with specific products or services deployed by the vendor 240 at customer sites 210. If these specific products or services are causing the operational events depicted in the ODRs 233, and thereby increasing the customers TCO, then the vendor feedback system 100 can help to decrease the customer's TCO by capturing ODRs 233 from a plurality of customer sites 210 under a variety of different environments, as may be reported preferably using a common, standardized operations management system 110 deployed on those customer sites 210.

Figure 6:
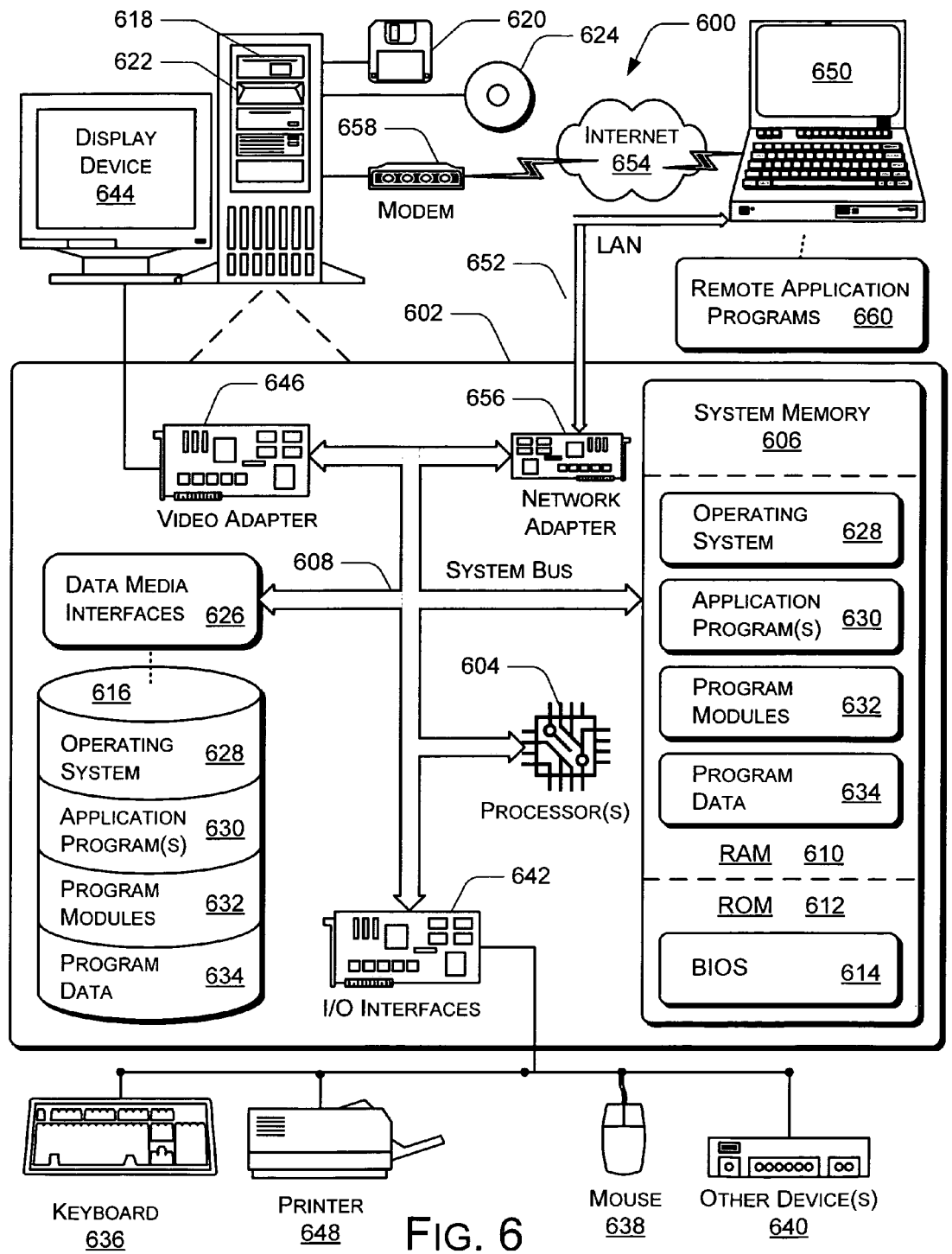
FIG. 6 is a block diagram of an overall computing environment suitable for practicing the vendor feedback system.

FIG. 6 illustrates an exemplary computing environment 600 within which the vendor feedback system 100, as well as the computing, network, and system architectures described herein, can be either fully or partially implemented on either the customer sites 210 or the vendor site 240. Exemplary computing environment 600 is only one example of a computing system and is not intended to suggest any limitation as to the scope of use or functionality of the architectures. Neither should the computing environment 600 be interpreted as having any dependency or requirement relating to any one or combination of components illustrated in the exemplary computing environment 600.

The computer and network architectures in computing environment 600 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 600 includes a general-purpose computing system in the form of a computing device 602. The components of computing device 602 can include, but are not limited to, one or more processors 604 (e.g., any of microprocessors, controllers, and the like), a system memory 606, and a system bus 608 that couples the various system components. The one or more processors 604 process various computer executable instructions to control the operation of computing device 602 and to communicate with other electronic and computing devices. The system bus 608 represents any number of several types of bus structures, including a memory bus or memory controller, a peripheral bus, an accelerated graphics port, and a processor or local bus using any of a variety of bus architectures.

Computing environment 600 includes a variety of computer readable media which can be any media that is accessible by computing device 602 and includes both volatile and non-volatile media, removable and non-removable media. The system memory 606 includes computer readable media in the form of volatile memory, such as random access memory (RAM) 610, and/or non-volatile memory, such as read only memory (ROM) 612. A basic input/output system (BIOS) 614 maintains the basic routines that facilitate information transfer between components within computing device 602, such as during start-up, and is stored in ROM 612. RAM 610 typically contains data and/or program modules that are immediately accessible to and/or presently operated on by one or more of the processors 604.

Computing device 602 may include other removable/non-removable, volatile/non-volatile computer storage media. By way of example, a hard disk drive 616 reads from and writes to a non-removable, non-volatile magnetic media (not shown), a magnetic disk drive 618 reads from and writes to a removable, non-volatile magnetic disk 620 (e.g., a "floppy disk"), and an optical disk drive 622 reads from and/or writes to a removable, non-volatile optical disk 624 such as a CD-ROM, digital versatile disk (DVD), or any other type of optical media. In this example, the hard disk drive 616, magnetic disk drive 618, and optical disk drive 622 are each connected to the system bus 608 by one or more data media interfaces 626. The disk drives and associated computer readable media provide non-volatile storage of computer readable instructions, data structures, program modules, and other data for computing device 602.

Any number of program modules can be stored on RAM 610, ROM 612, hard disk 616, magnetic disk 620, and/or optical disk 624, including by way of example, an operating system 628, one or more application programs 630, other program modules 632, and program data 634. Each of such operating system 628, application program(s) 630, other program modules 632, program data 634, or any combination thereof, may include one or more embodiments of the systems and methods described herein.

Computing device 602 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example and not limitation, communication media includes wired media such as a wired network or direct-wired connection, and wireless media such as acoustic, RF, infrared, other wireless media, and/or any combination thereof.

A user can interface with computing device 602 via any number of different input devices such as a keyboard 636 and pointing device 638 (e.g., a "mouse"). Other input devices 640 (not shown specifically) may include a microphone, joystick, game pad, controller, satellite dish, serial port, scanner, and/or the like. These and other input devices are connected to the processors 604 via input/output interfaces 642 that are coupled to the system bus 608, but may be connected by other interface and bus structures, such as a parallel port, game port, and/or a universal serial bus (USB).

A display device 644 (or other type of monitor) can be connected to the system bus 608 via an interface, such as a video adapter 646. In addition to the display device 644, other output peripheral devices can include components such as speakers (not shown) and a printer 648 which can be connected to computing device 602 via the input/output interfaces 642.

Computing device 602 can operate in a networked environment using logical connections to one or more remote computers, such as remote computing device 650. By way of example, remote computing device 650 can be a personal computer, portable computer, a server, a router, a network computer, a peer device or other common network node, and the like. The remote computing device 650 is illustrated as a portable computer that can include any number and combination of the different components, elements, and features described herein relative to computing device 602.

Logical connections between computing device 602 and the remote computing device 650 are depicted as a local area network (LAN) 652 and a general wide area network (WAN) 654. Such networking environments are commonplace in offices, enterprise-wide computer networks, intranets, and the Internet. When implemented in a LAN networking environment, the computing device 602 is connected to a local network 652 via a network interface or adapter 656. When implemented in a WAN networking environment, the computing device 602 typically includes a modem 658 or other means for establishing communications over the wide area network 654. The modem 658 can be internal or external to computing device 602, and can be connected to the system bus 608 via the input/output interfaces 642 or other appropriate mechanisms. The illustrated network connections are merely exemplary and other means of establishing communication link(s) between the computing devices 602 and 650 can be utilized.

In a networked environment, such as that illustrated with computing environment 600, program modules depicted relative to the computing device 602, or portions thereof, may be stored in a remote memory storage device. By way of example, remote application programs 660 are maintained with a memory device of remote computing device 650. For purposes of illustration, application programs and other executable program components, such as operating system 628, are illustrated herein as discrete blocks, although it is recognized that such programs and components reside at various times in different storage components of the computing device 602, and are executed by the one or more processors 604 of the computing device 602.

Although embodiments of the teachings herein have been described in language specific to structural features and/or methods, it is to be understood that the subject of the appended claims is not necessarily limited to the specific features or methods described. Rather, the specific features and methods are disclosed as exemplary implementations of the teachings herein.

What is claimed is:

1. A computer-implemented vendor-feedback method to provide feedback to a vendor of components provided to customer data centers, the method comprising:
    associating an anonymous and unique identifier with a given customer;
    utilizing an operations management system to provide a standardized environment for reporting on operational events that affect the analysis and resolution of an issue associated with a component, on a plurality of customer data centers and to track the total cost of ownership of the components, the total cost of ownership based at least in part upon a professional service fee; and
    enabling vendor personnel associated with the vendor to specify operational event data reports to obtain from the customer data centers, wherein the operational event data reports correspond to operational events of interest to the vendor personnel, and wherein the operational event data reports received from the customer data centers are stripped of any private data.

2. The computer-implemented vendor-feedback method of claim 1, further comprising accessing the customer data centers using the operations management system.

3. The computer-implemented vendor-feedback method of claim 1, further comprising defining at least one rule for capturing raw operational event data for compiling the specified operational event data reports, and for obtaining, in response to the rule, the raw operational event data upon which the operational event data reports are based.

4. The computer-implemented vendor-feedback method of claim 3, further comprising aggregating the raw operational event data.

5. The computer-implemented vendor-feedback method of claim 3, further comprising normalizing the raw operational event data.

6. The computer-implemented vendor-feedback method of claim 1, further comprising establishing a respective context for instances of the operational event data reports.

7. The computer-implemented vendor-feedback method of claim 1, further comprising enabling a customer to opt-in to allow the vendor personnel to obtain the operational event data reports.

8. The computer-implemented vendor-feedback method of claim 1, further comprising enabling a customer to approve the operational event data reports before they are transmitted to the vendor personnel.

9. The computer-implemented vendor-feedback method of claim 1, further comprising tracking data relating to the customer installation over time using, at least in part, the anonymous and unique identifier associated with the given customer.

10. The computer-implemented vendor-feedback method of claim 9, further comprising offering a customized support service to the given customer using, at least in part, the anonymous and unique identifier.

11. The computer-implemented vendor-feedback method of claim 1, further comprising automatically populating a data store on a vendor site with the operational event data reports as they are received from the customer data centers.

12. In connection with an operations management system that provides a standardized environment for reporting on operational events occurring on a plurality of customer data centers, a computer-implemented method for providing feedback to a vendor of components installed at the customer data centers, the method comprising at least the following:
    traversing designated storage locations on the customer data centers to locate reports of operational events that were stored therein responsive to requests received from the vendor, wherein the requests specify operational event data reports to obtain from the customer data centers, wherein the operational event data reports correspond to operational events of interest to vendor personnel, and wherein the operational events affect the analysis and resolution of an issue associated with a component, and impact the total cost of ownership of components provided to the customer data centers by the vendor, the total cost of ownership based at least in part upon a professional service fee;
    stripping the operational event data reports of any private data;

packaging the reports of the operational events for transmission to the vendor; and transmitting the reports to the vendor as feedback relating to the components.

13. The method of claim 12, wherein traversing designated storage locations includes traversing storage locations that are assigned to specific developments groups within the vendor.

14. The method of claim 12, wherein traversing designated storage locations includes traversing storage locations that are assigned to specific application developments groups within a software vendor.

15. The method of claim 12, further comprising creating a manifest document directing that the reports be transmitted to the vendor.

16. The method of claim 12, further comprising populating header data structures associated with the transportable format with data extracted from the reports.

17. The method of claim 12, further comprising enabling logging for a communications process that transmits the reports from the customer data center to the vendor.

18. The method of claim 12, further comprising rendering the reports in a transportable, human-readable format.

19. The method of claim 12, further comprising encrypting the reports for transmission.

20. In connection with an operations management system that provides a standardized environment for reporting on operational events occurring on a plurality of customer data centers, a computer-implemented method for obtaining and processing feedback provided to a vendor of components installed at the customer data centers, the method comprising at least the following:

enabling a customer to opt-in to allow vendor personnel associated with the vendor to receive data pertaining to the operational events;

associating an anonymous and unique identifier with a given customer;

directing the operations management system to report on predefined operational events that affect the analysis and resolution of an issue associated with a component, and impact the total cost of ownership of the components installed by the vendor at the customer data centers, the total cost of ownership based at least in part upon a professional service fee;

receiving reports on the operational events from the customer data centers, wherein the operational event data reports correspond to operational events of interest as specified by vendor personnel and wherein the operational events involve components provided to the customer data centers by the vendor, wherein:

at least one rule is defined for capturing raw operational event data upon which the operational event data reports are based and for compiling operational event data reports, the raw data is obtained, aggregated and normalized in response to the at least one rule, and the operational event data reports received from the customer data centers are stripped of any private data;

delivering the reports to secured servers maintained by the vendor;

enabling authorized representatives of the vendor to analyze the reports; and addressing the operational events based at least in part on analyzing the reports.

* * * * *